United States Patent [19]
Neufeld

[11] Patent Number: 5,522,065
[45] Date of Patent: May 28, 1996

[54] METHOD FOR PERFORMING WRITE OPERATIONS IN A PARITY FAULT TOLERANT DISK ARRAY

[75] Inventor: E. David Neufeld, Tomball, Tex.

[73] Assignee: Compaq Computer Corporation, Houston, Tex.

[21] Appl. No.: 255,108

[22] Filed: Jun. 7, 1994

Related U.S. Application Data

[63] Continuation of Ser. No. 752,773, Aug. 30, 1991, abandoned.

[51] Int. Cl.$^6$ ..................................................... G06F 11/10
[52] U.S. Cl. ................................. 395/182.04; 371/51.1; 395/427
[58] Field of Search .................................. 395/575, 425; 371/2.2, 10.1, 51.1

[56] References Cited

U.S. PATENT DOCUMENTS

| | | | |
|---|---|---|---|
| 4,157,586 | 6/1979 | Gannon et al. | 395/425 |
| 5,088,081 | 2/1992 | Farr | 371/10.1 |
| 5,155,835 | 10/1992 | Belsan | 395/425 |
| 5,155,845 | 10/1992 | Beal et al. | 395/575 |
| 5,191,584 | 3/1993 | Anderson | 371/10.1 |
| 5,208,813 | 5/1993 | Stallmo | 371/10.1 |
| 5,224,214 | 6/1993 | Rosich | 395/425 |
| 5,235,693 | 8/1993 | Chinnaswamy et al. | 395/425 |
| 5,257,362 | 10/1993 | Menon | 395/425 |
| 5,263,145 | 11/1993 | Brady et al. | 395/425 |
| 5,265,098 | 11/1993 | Mattson et al. | 371/11.1 |

OTHER PUBLICATIONS

Gracefully Degradable Disk Arrays A. L. Narasimha Reddy & P. Banerjee 1999 IEEE pp. 401–408.

A. Chervenak, "Performance Measurements of the First RAID Prototype", University of California, Berkeley, Computer Science Division, May, 1990.

Data Storage Interface and Technology Conference VII—Disk Array Seminar, Technology Forums, Ltd., Mar. 11, 1991.

J. Hartman and J. Ousterhout, "Performance Measurements of a Multiprocessor Sprite Kernel", USENIX Summer Conference, Jun. 11–15, 1990.

J. Ousterhout, "Why Aren't Operating Systems Getting Faster As Fast as hardware?", USENIX Summer Conference, Jun. 11–15, 1990.

P. Chen and D. Patterson, "Maximizing Performance in a Striped Disk Array", 17th Annual International Symposium of Computer Architecture (SIGARCH) 1990.

E. Miller, "Input/Output Behavior of Supercomputing Applications", University of California, Berkeley, Computer Science Division, Jan., 1991.

E. Lee and R. Katz, "Performance Consequences of Parity Placement in Disk Arrays", University of California, Berkeley, Computer Science Division, Apr., 1991.

E. Lee, "Software and Performance Issued in the Implementation of a RAID Prototype", University of California, Berkeley, Computer Science Division, May, 1990.

*Primary Examiner*—Robert W. Beausoliel, Jr.
*Assistant Examiner*—Albert Decady
*Attorney, Agent, or Firm*—Pravel, Hewitt, Kimball & Krieger

[57] ABSTRACT

A method for managing disk operations for a computer having a disk array utilizing parity fault tolerant and recovery techniques. A disk READ request results in a copy of the data and its associated parity information being stored in a reserved memory cache. Subsequent WRITE requests to the same disk sectors result in the computer system checking to see if a valid copy of the old parity and data are present in the reserved memory area for the purposes of generating new parity information without having to read the old data and parity information from the disk array.

7 Claims, 10 Drawing Sheets

METHOD FOR PERFORMING WRITE OPERATIONS IN A PARITY FAULT TOLERANT DISK ARRAY

This is a continuation of application Ser. No. 07/752,773, filed on Aug. 30, 1991, now abandoned.

BACKGROUND OF THE INVENTION

1. Field of the Invention

The present method is directed toward a method for improving performance for multiple disk drives within a computer systems, more particularly, to a method for performing write operations in a disk array utilizing parity data redundancy and recovery protection.

2. Description of the Related Art

Microprocessors and the computers which utilize them have become increasingly more powerful during the recent years. Currently available personal computers have capabilities in excess of the mainframe and minicomputers of ten years ago. Microprocessor word sizes of 32 bits are widely available whereas in the past 8 bits was conventional and 16 bits was common.

Personal computer systems have developed over the years and new uses are being discovered daily. The uses are varied and, as a result, have different requirements for various subsystems forming a complete computer system. With the increased performance of computer systems, it became apparent that mass storage subsystems, such as fixed disk drives, played an increasingly important role in the transfer of data to and from the computer system. In the past few years, a new trend in storage subsystems has emerged for improving data transfer performance, capacity and reliability. This is generally known as a disk array subsystem. One reason for building a disk array subsystem is to create a logical device that has a very high data transfer rate. This may be accomplished by "ganging" multiple standard disk drives together and transferring data to or from these drives to the system memory. If n drives are ganged together, then the effective data transfer rate is increased up to n times. This technique, known as striping, originated in the supercomputing environment where the transfer of large amounts of data to and from secondary storage is a frequent requirement. In striping, a sequential data block is broken into segments of a unit length, such as sector size, and sequential segments are written to sequential disk drives, not to sequential locators on a single disk drive. These operations can be performed in parallel, thus effectively increasing the data transfer rate. If the data block is longer than N unit lengths, the process repeats for the next sector location on the disk drives. With this approach, the n physical drives become a single logical device and may be implemented either through software or hardware.

A second reason for building disk array subsystems is to provide for data protection and recovery. Two data protection and recovery techniques have generally been used to restore data in the event of a catastrophic drive failure. One technique is the mirrored drive. The mirrored drive technique provides for a redundant drive for every data drive within an array. A write to a disk array utilizing a mirrored drive fault tolerance technique will result in a write to the primary data disk and a write to the mirrored drive. This technique results in the minimum loss of performance in the disk array. However, the disadvantage to this technique is that it uses 50% of the available data storage for redundancy purposes. This results in a relatively high cost per available storage unit.

Another technique is the use of a parity scheme which reads data blocks being written to various drives within the array and uses a known exclusive-or (XOR) technique to create parity information which is written to a reserved or parity drive within the array. The advantage to this technique is that it may be used to minimize the amount of data storage dedicated to data redundancy and recovery purposes within the array. In an 8 drive array, the parity technique would call for one drive to be used for parity information; thus, 12.5% of total storage is dedicated to redundancy, as compared to the 50% using the mirrored drive technique. The use of the parity drive technique reduces the cost of storage.

However, there are a number of disadvantages to the use of parity fault tolerance techniques. Primary among them is the loss of performance within the disk array as the parity drive must be updated each time a data drive is updated or written to. The data must undergo the XOR process in order to write the updated parity information to the parity drive as well as writing the data to the data drives. This process may be partially alleviated by having the parity data also distributed, relieving the load on the dedicated parity disk. However, this would not reduce the number of overall data write operations. In addition to the time required to perform the actual operations, it will be appreciated that a READ operation followed by a WRITE operation to the same sector on a disk will result in the loss of one disk revolution, or approximately 16.5 milliseconds for hard disk drives according to the preferred embodiment.

The use of the host processor to perform XOR parity information generation requires that the drive data go from the drives to a transfer buffer in the host system, that the updated drive data be processed by the host processor to create the new XOR parity information, and that the parity information be transferred to the parity drive via a transfer buffer in host system memory. As a result, the host processor encounters a significant overhead in managing the generation of the XOR parity data. The use of a local processor within a disk array to create XOR parity information also encounters many of the same problems that a system processor would. The drive data must again go from the drives to a transfer buffer in local processor memory to allow the local processor to generate the XOR parity data and the parity data must be written to the parity drive via the transfer buffer in local memory.

The use of an intelligent disk array (IDA) controller having a dedicated XOR parity engine was disclosed in U.S. patent application Ser. No. 431,735, assigned to Compaq Computer Corporation, assignee of the present invention and in European Patent Office Publication No. 0427119, published Apr. 4, 1991, the counterpart to the U.S. application. The apparatus described therein utilized a disk array DMA channel composed of four individual subchannels. A dedicated XOR engine utilized one of the four subchannels, generating parity data on a word for word basis from up to four different transfer blocks. The XOR engine was also capable of writing the result to a specified drive or to a transfer buffer through the subchannel.

However, even this apparatus may suffer from performance loss when updating data already stored on disk. Computer operations often call for data stored on a disk to first be read, modified by the process active on the host system, and written back to the same address on the data disk. This process consists of a data disk READ, modification of the data, and a data disk WRITE to the same address.

Where an entire disk stripe is being written to the array, the parity information may be generated directly from the data being written to the drive array. However, a problem occurs when the computer writes only a partial stripe to a disk within the array, as the array controller does not have sufficient information to compute parity for the entire stripe. There are two means of addressing this problem.

In the first technique, the process of updating a data disk in an XOR parity fault tolerant system includes issue of a READ command, which reads and transfers the requested data to an address in system memory via transfer buffers. The data is modified by the process running on the computer system and a WRITE command is issued to write the updated data back to the sectors from which it was read. However, in order to maintain parity fault tolerance, the computer system must first READ the parity information from the parity disk for the data disk sectors which are being updated and the old data values that are to be replaced from the data disk. The XOR parity information is then recalculated by the host or a local processor, or a dedicated XOR engine as in application Ser. No. 431,735 by OXRing the old data sectors to be replaced with the related parity sectors. This recovers the parity value without those data values. The new data values are OXRed on to this recovered value to produce the new parity data. A WRITE command is executed, writing the updated data to the data disks and the new parity information to the parity disk. It will be appreciated that this process requires two additional partial sector READ operations, one from the parity disk and one reading the old data, prior to the generation of the new XOR parity information. Consequently, data transfer performance suffers.

The second method requires reading the remainder of the data that is not to be repudiated for the stripe, despite the fact that it is not being replaced by the WRITE operation. Using the new data and the old data which has been retrieved, the new parity information may be determined for the entire stripe which is being updated. This process requires a READ operation of the data not to be replaced and a full strip WRITE operation to save the parity information.

A disk array utilizing parity fault tolerance previously had to perform one of the above techniques to manage partial stripe WRITE operations. It will be appreciated that in either instance, the time required to perform the READ operations to obtain old data, old parity or the remainder of the stripe data may significantly increase the time required to perform disk WRITE operations. This is generally in large part due to the fact that a sector which has just been read must in the next command be written. This results in the loss of an entire disk revolution, commonly 16.5 MS as noted above. This is true whether the XOR parity information is being generated by either a system processor, a local processor or a dedicated XOR parity engine as disclosed in U.S. application Ser. No. 431,735. Accordingly, there exists a need for improved method for performing partial stripe disk WRITE operations in a parity fault tolerant disk array.

SUMMARY OF THE INVENTION

The present invention is directed toward a method for improving disk performance for a personal computer having a disk array subsystem utilizing XOR parity fault tolerance and recovery techniques, especially partial stripe WRITE operations.

The typical disk READ command specifies the disk address of the data to be read and a destination address for the data in system memory. The present invention modifies the READ command to generate disk controller commands which will also specify a READ operation for the associated XOR parity information and a destination address in a reserved system memory area for the XOR parity information and a copy of the data. This reserved memory area operates as a cache memory using conventional cache techniques including cache tags which are associated with the addresses in disk array memory and a data line or page, in which the data for the specified tag is stored. Herein, the addresses and data stored in the reserved memory area cache are related to disk addresses and data. The reserved memory area size may be determined during configuration of the computer system. The reserved memory area operates as a cache memory and may be managed using known cache management techniques and replacement algorithms, such as valid bits, FIFO, least recently used (LRU), or variations of random replacement. It is contemplated in one embodiment that any replacement of parity or data in this reserved memory will also result in the replacement of associated data or parity information, respectively.

When the device driver issues a WRITE command to write the updated disk data, the computer will search the reserved system memory area cache for the address tags related to the addresses to be written to on the data disks. When the address tags for the sectors to be updated are found in the reserved memory area, the reserved memory area will include a copy of the old data and a copy of the old XOR parity data. If present, a pointer will be set to the location in the reserved memory area and the appropriate processor will read the parity information and old data from the reserved memory area and generate the new parity using the new data, the old data and the old parity information using known XOR parity techniques. The valid bits for the old data and its associated parity information are then set to invalid. The updated data and new parity information are then written to the data and parity disks, respectively. Further, a copy of the new data and parity information is written to the reserved memory area and the appropriate bits set to valid. It will be appreciated that the time required for the system processor to check the reserved memory area to determine if the parity information and old data for the disk sectors to be updated are present is significantly less than the time required to read the old parity information and old data from their respective disks within the array. It is also noted that because the need to read partial sector information is omitted, the loss of an entire disk revolution developed due to a back-to-back read and write to the same disk sector is avoided, therefore significantly improving operations in partial stripe operations.

In those instances where the old parity information and old data are not present in the reserved memory area, the present invention will read the old parity information and the old data from their respective disks to generate the new parity information as was previously done. Further, a copy of the new data and parity information will be written to the reserved memory area and the appropriate bits set valid.

It will be appreciated that the present invention will also affect disk READ times. When an application program running on the computer generates a disk READ command the present invention will instruct the system processor to check the reserved memory area address tags to determine if the data to be read from the disk array and its associated parity information are present in the reserved memory area. If the data and its associated parity information are present and valid in the reserved memory area, the data transfer is accomplished from the reserved memory area as opposed to the disk array. It will be appreciated that the number of parity READ hits which occur is a function of the size of the reserved memory area.

In a further variation, use of the reserved system memory area could be improved for data caching operations when a full data stripe is present in the reserved area. Where the full stripe is present, it is not necessary to retain the parity information as it can be fully generated by performing a full stripe operation, not the previous, time-consuming, partial stripe operation. The new parity information is simply generated as in any other full stripe case. Thus, less parity data needs to be stored, allowing more data to be stored, thereby improving cache operations.

BRIEF DESCRIPTION OF THE FIGURES

A better understanding of the present invention can be had when the following detailed description of the preferred embodiment is considered in conjunction with the following drawings, in which.

DETAILED DESCRIPTION OF THE PREFERRED EMBODIMENT

The computer system and disk array subsystem described below represent the preferred embodiment of the present invention. It is also contemplated that other computer systems, not having the capabilities of the system described below, may be used to practice the present invention.

Figure 1:
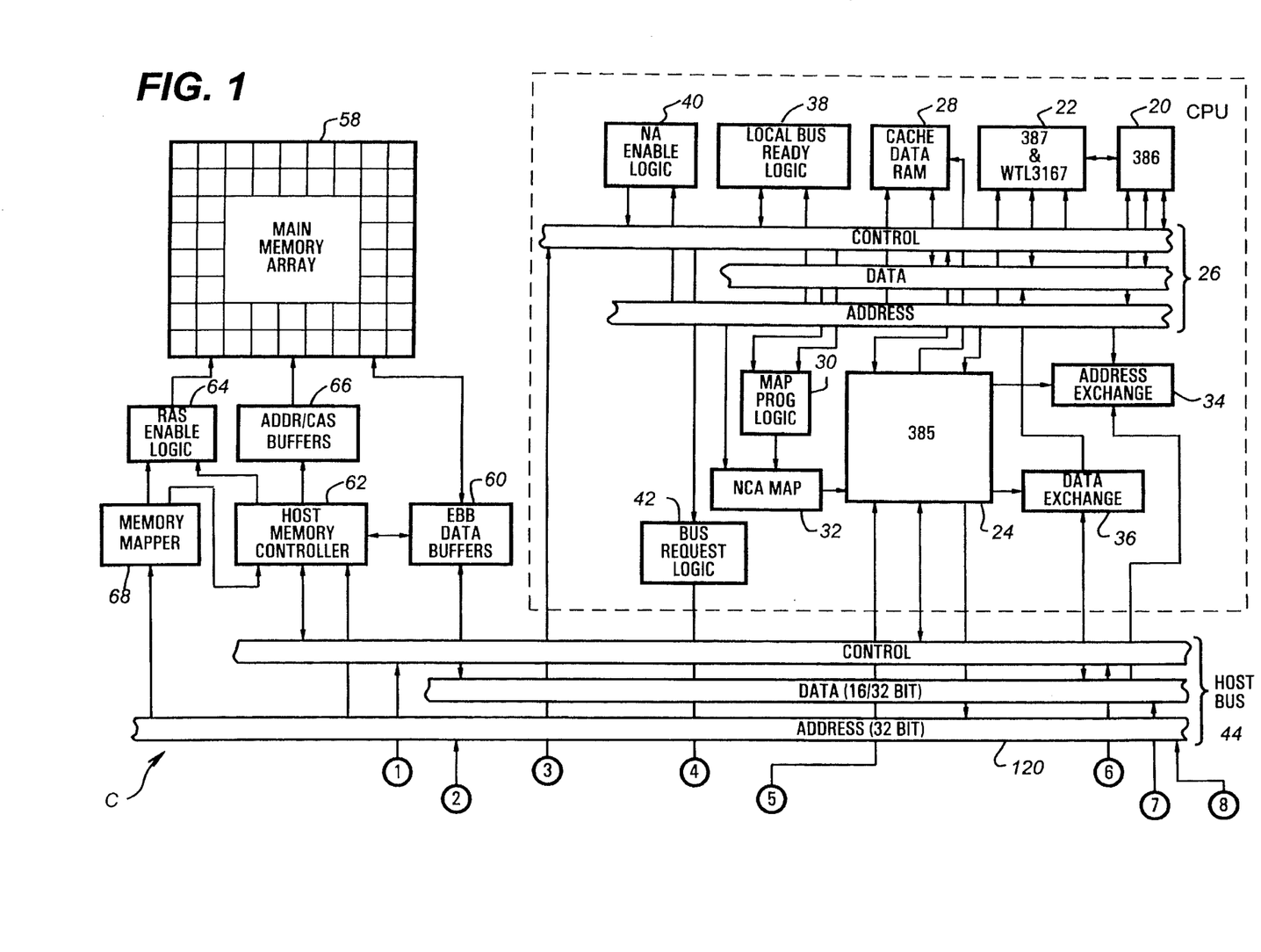
FIGS. 1, 2A and 2B are block diagrams of an illustrative computer system on which the method of the present invention may be practiced.
Figure 2A:
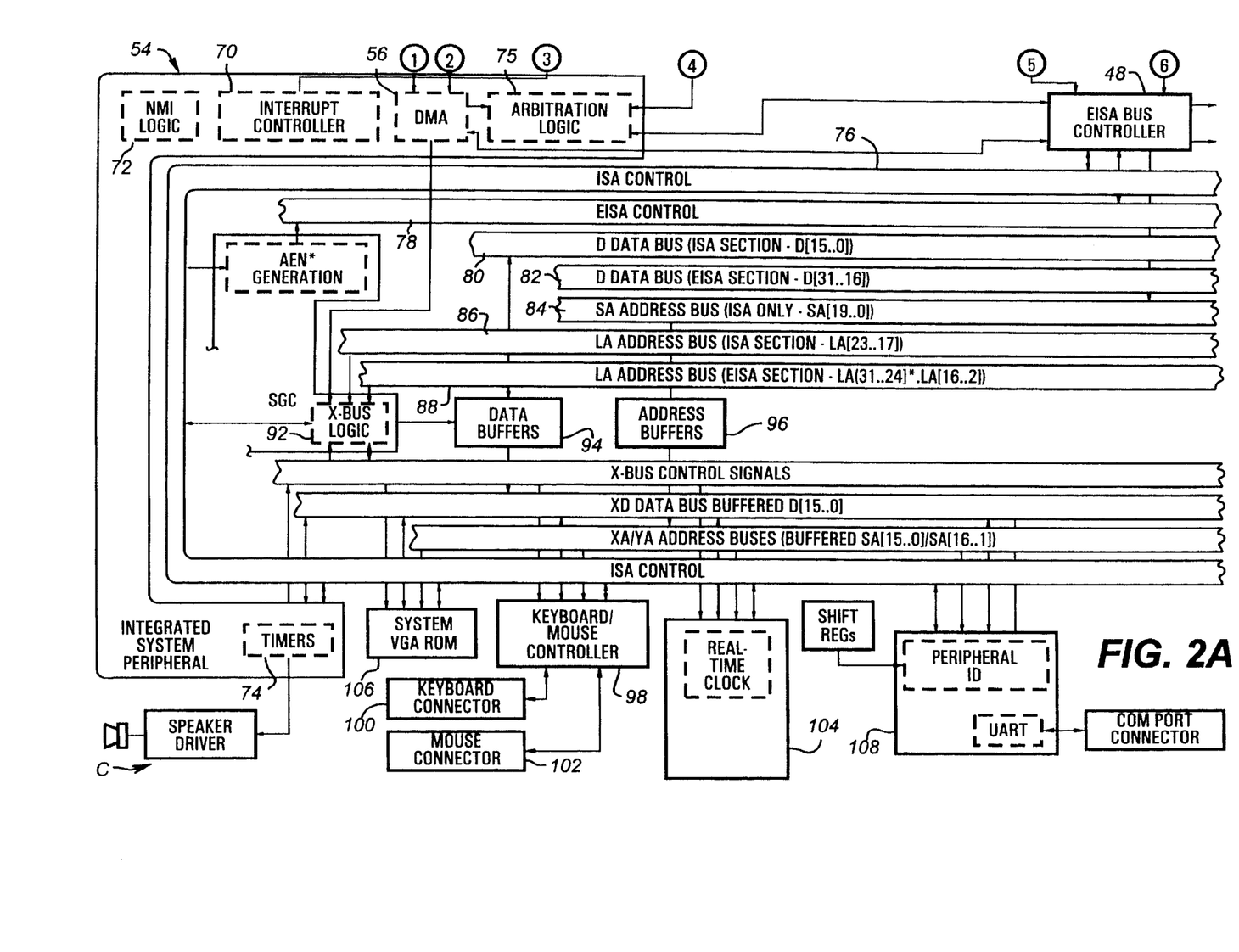
Figure 2B:
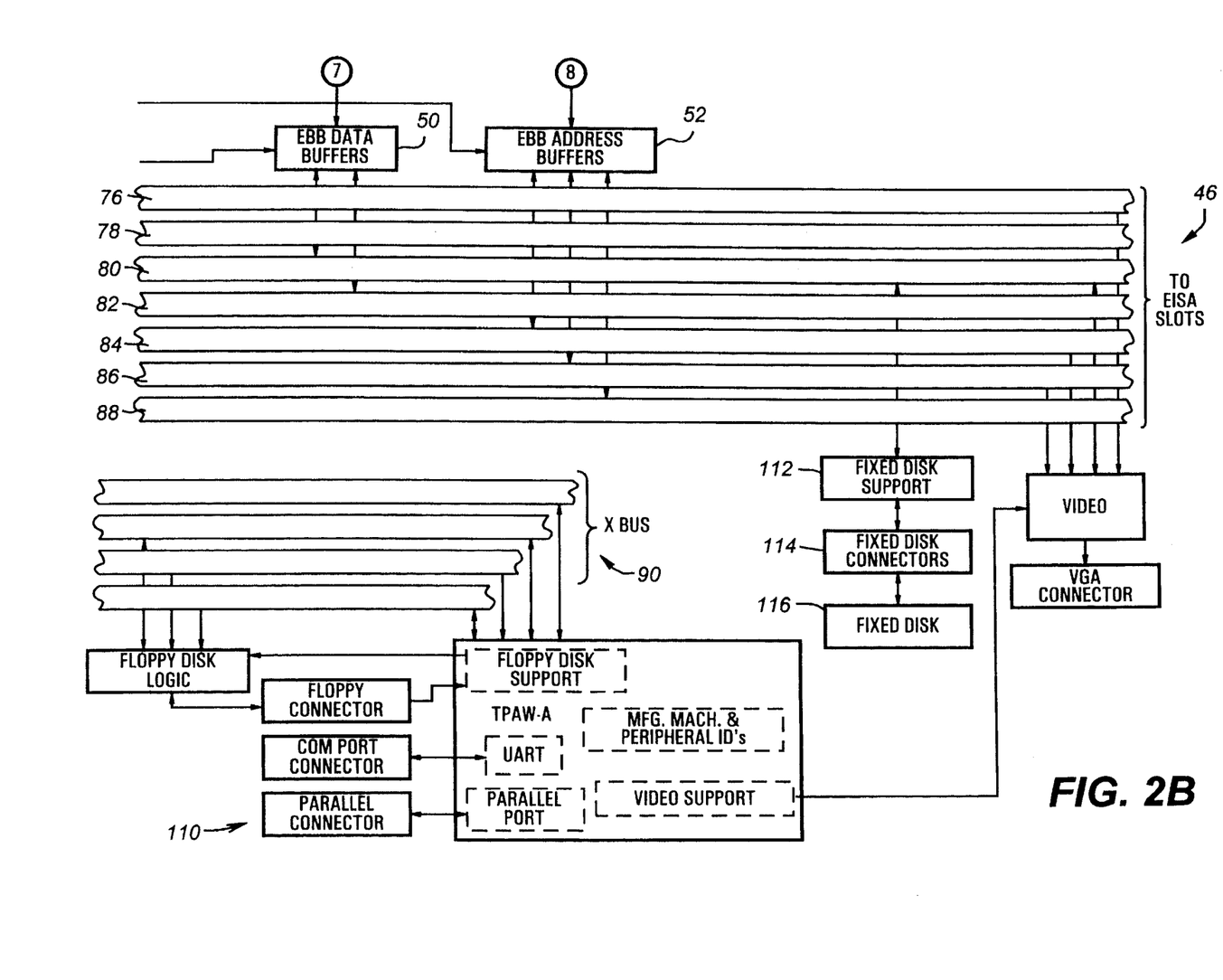

Referring now to FIGS. 1, 2A and 2B, the letter C generally designates a computer system on which the present invention may be practiced. For clarity, system C is shown in two portions with the interconnections between FIGS. 1, 2A and 2B designated by reference to the circled numbers 1 to 8. System C is comprised of a number of block elements interconnected via 4 busses.

A central processing unit CPU comprises a system processor 20, a numerical co-processor 22, a cache memory controller 24, and associated logic circuits connected to a system processor bus 26. Associated with cache controller 24 is a high speed cache data random access memory (DRAM) 28, non-cacheable memory address map programming logic circuitry 30, non-cacheable address memory 32, address exchange latch circuitry 34 and data exchange transceiver 36. Associated with the CPU also are system processor ready logic circuit 38, next address enable logic circuit 40 and bus request logic circuit 42.

The system processor is preferably an Intel Corporation 80386 or 80486 microprocessor. The system processor 20 has its control, address and data lines interfaced to the system processor bus 26. The coprocessor 22 is preferably an Intel 80387 and/or Weitek WTL3167 numerical processor interfacing with the local processor bus 26 and the system processor 20 in the conventional manner. The cache RAM 28 is preferably a suitable high-speed static random access memory which interfaces with the address and data elements of bus 26 under the control of the cache controller 24 to carry out required cache memory operations. The cache controller 24 is preferably an Intel 82385 cache controller configured to operate in two-way set associative master mode. In the preferred embodiment, the components are the 33 MHZ versions of the respective units. An Intel 80486 microprocessor and an external cache memory system may replace the 80386, numeric coprocessor, 82385 and cache system if desired. Address latch circuity 34 and data transceiver 36 interface the cache controller 34 with the processor 20 and provide a local bus interface between the processor bus 26 and a host bus 44. Circuit 38 is a logic circuit which provides a bus ready signal to control access to the bus 26 and indicate when the next cycle may begin. The enable circuit 40 is utilized to indicate that the next address of data or code to be utilized by via subs-subsystem elements in the pipelined address mode may be placed on the local bus 26.

Non-cacheable memory address map programmer 30 cooperates with the processor 20 and the non-cacheable address memory 32 to map non-cacheable memory locations. The non-cacheable address memory 32 is utilized to designate areas of the system memory that are non-cacheable to avoid many types of cache memory incoherency. The bus request logic circuit 42 is utilized by the processor 20 and associated elements to request access to the host bus 44 in situations such as when requested data is not located in cache memory 28 and access to system memory is required.

In the drawings, System C is configured as having the processor bus 26, the host bus 44, an extended industry standard architecture (EISA) bus 46 (FIGS. 2A and 2B) and an X bus 90. The details of the portions of the system illustrated in FIGS. 2A and 2B and not discussed in detail below are not significant to the present invention other than to illustrate an example of a fully configured computer system. The portion of System C illustrated in FIGS. 2A and 2B is essentially a configured EISA system which includes the necessary EISA bus 46, and EISA bus controller 48, data latches and transceivers 50 and address latches and buffers 52 to interface between the EISA bus 46 and the host bus 44. Also illustrated in FIGS. 2A and 2B is an integrated system peripheral (ISP) 54, which incorporates a number of the elements used in an EISA-based computer system.

The integrated ISP 54 includes a direct memory access controller 56 for controlling access to main memory 58 (FIG. 1) or memory contained in an EISA slot and input/output (I/O) locations without the need for access to the processor 20. The main memory array 58 is considered to be system memory. It comprises a memory circuit array of a size suitable to accommodate the particular requirements of the system. Preferably, a portion of the main memory array 58 is reserved to accommodate the operation of the present invention. It is contemplated that the reserved memory area will be in excess of 1 Mbyte but may be set to other sizes during a configuration of the computer system C. The ISP 54 also includes interrupt controllers 70, non-maskable interrupt logic 72, and system timer 74 which allow control of interrupt signals and generate necessary timing signals and wait states in a manner according to the EISA specification and conventional practice. In the preferred embodiment, processor generated interrupt requests are controlled via dual interrupt controller circuits emulating and extending conventional Intel 8259 interrupt controllers. The ISP 54 also includes bus arbitration logic 75 which, in cooperation with the bus controller 48, controls and arbitrates among the various requests for EISA bus 46 by cacheable controller 24, the DMA controller 56, and bus master devices located on the EISA bus 46.

The main memory array 58, including the reserved memory area, is preferably dynamic random access memory. Memory 58 interfaces with the host bus 44 via a data buffer circuit 60, a memory controller circuit 62, and a memory mapper 68. The buffer 60 performs data transceiving and parity generating and checking functions. The memory controller 62 and memory mapper 68 interface with the memory 58 via address multiplexor and column address strobe buffers 66 and row address enable logic circuit 64.

The EISA bus 46 includes ISA and EISA control busses 76 and 78, ISA and EISA data busses 80 and 82, and are interfaced via the X bus 90 in combination with the ISA control bus 76 from the EISA bus 46. Control and data/address transfer for the X bus 90 are facilitated by X bus control logic 92, data transceivers 94 and address latches 96.

Attached to the X bus are various peripheral devices such as keyboard/mouse controller 98 which interfaces with the X bus 90 with a suitable keyboard and a mouse via connectors 100 and 102, respectively. Also attached to the X bus are read only memory (ROM) circuits 106 which contain basic operation software for the System C and for system video operations. A serial port communications port 108 is also connected to the System C via the X bus 90. Floppy and fixed disk support, a parallel port, a second serial port, and video support circuits are provided in block circuit 110.

A disk array controller 112 is connected to the EISA bus 46, preferably in a slot, to provide for the communication of data and address information through the EISA bus 46. Fixed disk connectors 114 are connected to the fixed disk controller 112 and are in turn connected to a fixed disk array 116.

Figure 3:
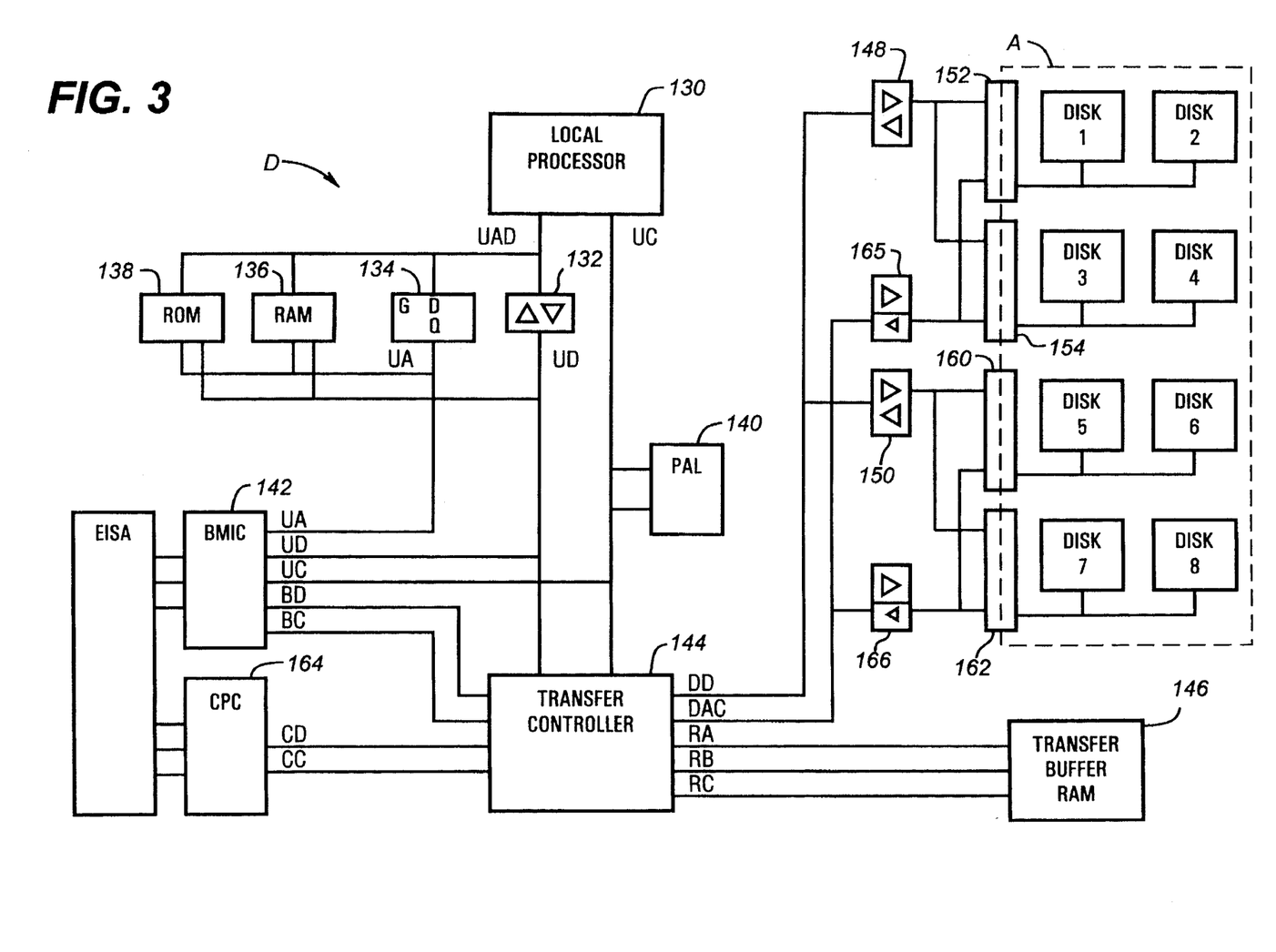
FIG. 3 is a block diagram of the intelligent disk controller in the preferred embodiment.

Referring now to FIG. 3, the letter D generally refers to a disk array controller 112 used to illustrate the method of the present invention. The disk array controller 112 has a local processor 130, preferably an Intel 80186. The local processor 130 has a multiplexed address/data bus UAD and control outputs UC. The multiplexed address data bus UAD is connected to a transceiver 132 whose output is the local processor data bus UD. The multiplexed address/data bus UAD is also connected to the D inputs of a latch 134 whose Q outputs form the local processor address bus UA. The local processor 130 has associated with it random access memory (RAM) 136 coupled via the multiplexed address/data bus UAD and the address data bus UA. The RAM 136 is connected to the processor control bus UC to develop proper timing signals. Similarly, read only memory (ROM) 138 is connected to the multiplexed address/data bus UAD, the processor address bus UA and the processor control bus UC. Thus, the local processor 130 has its own resident memory to control its operation and for its data storage. A programmable array logic (PAL) device 140 is connected to the local processor control bus UC to develop additional control signals utilized in the disk array controller 112.

The local processor address bus UA, the local processor data bus, UD and the local processor control bus UC are also connected to a bus master interface controller (BMIC) 142. The BMIC 142 serves the function of interfacing the disk array controller 112 with a standard bus, such as the EISA or MCA bus and acts as a bus master. In the preferred embodiment, the BMIC 142 is interfaced with the EISA bus and is the Intel 82355. Thus, by this connection with the local processor busses UA, UD and UC, the BMIC 142 can interface with the local processor 130 to allow data and control information to be passed between the host system C and the local processor 130.

Additionally, the local processor data bus UD and local processor control bus UC are connected to a transfer controller 144 which is explained in greater detail in U.S. application Ser. No. 431,735, but is generally a specialized multi-channel direct memory access (DMA) controller used to transfer data between the transfer buffer RAM 146 and various other devices present in the disk array controller 112. For example, the transfer controller 144 is connected to the BMIC 142 by the BMIC data lines BD and the BMIC control lines BC. Thus, over this interface, the transfer controller 144 can transfer data from the transfer buffer RAM 146 through the transfer controller 144 to the BMIC 142 if a READ operation is requested. If a WRITE operation is requested, data can be transferred from the BMIC 142 through the transfer controller 144 to the transfer buffer RAM 146. The transfer controller 144 can then pass this information from the transfer buffer RAM 146 to disk array A.

The transfer controller 144 includes a disk data bus DD and a disk address bus and control bus DAC. The disk address and control bus DAC is connected to two buffers 165 and 166 which are used to send and receive control signals between the transfer controller 144 and the disk array A. The outputs of the transceiver 148 and the transfer buffer 146 are connected to two disk drive port connectors 152 and 154. These two hard disks 156 and 158 can be connected to each connector 152 or 154. In similar fashion, two connectors 160 and 162 are connected to the outputs of the transceiver 150 and the buffer 166. Thus, in the preferred embodiment, up to 8 disk drives can be connected and coupled to the transfer controller 144. In this way, the various data, address and control signals can pass between the transfer controller 144 and particularly disk drives 156 and 158, for example.

In the illustrative disk array system 112, a compatibility port controller 164 (CPC) is also connected to the EISA bus. The CPC 164 is connected to the transfer controller 144 over the compatibility data lines CD and the compatibility control lines CC. The CPC 164 is provided so that the software which was written for previous computer systems, which do not have a disk array controller 112 and its BMIC 142, which are addressed over an EISA specific space and allow very high throughputs, can operate without requiring a rewriting of the software. Thus, the CPC 164 emulates the various control ports previously utilized in interfacing with hard disks.

Figure 4:
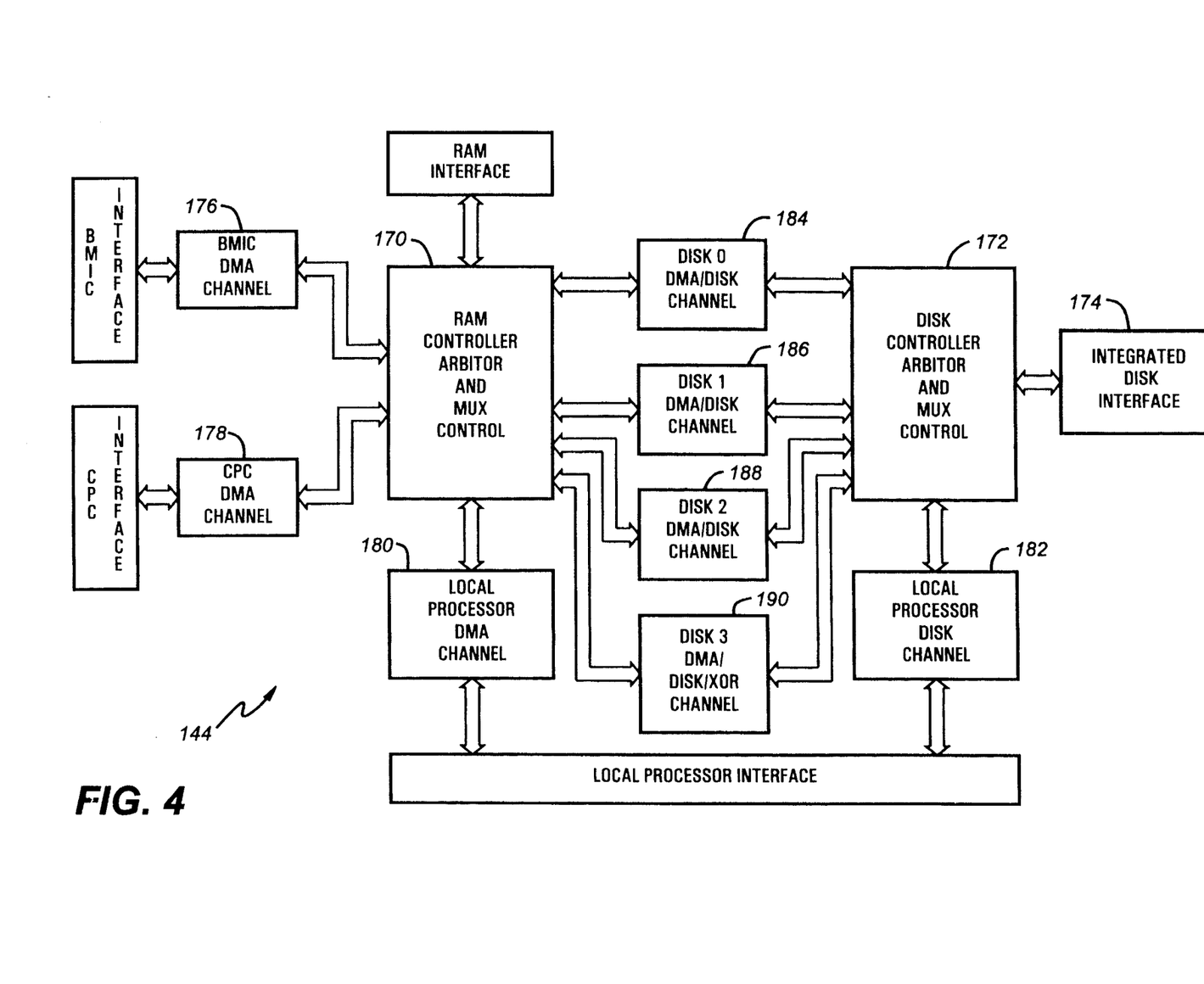
FIG. 4 is a functional block diagram of the disk array channel transfer controller of the preferred embodiment.

Referring now to FIG. 4, the transfer controller 144 is itself comprised of a series of separate circuitry blocks as shown in FIG. 4. There are two main units in the transfer controller 144 and these are the RAM controller 170 and the disk controller 172. The RAM controller 170 has an arbiter to control the various interface devices that have access to the transfer buffer RAM 146 and a multiplexor so that the data can be passed to and from the transfer buffer RAM 146. Likewise, the disk controller 172 includes an arbiter to determine which of the various devices has access to the integrated disk interface 174 and includes multiplexing capability to allow data to be properly transferred back and forth through the integrated disk interface 174.

There are basically 7 DMA channels present in the transfer controller 144. One DMA channel 176 is assigned to cooperate with the BMIC 142. A second DMA channel 178 is designed to cooperate with the CPC 164. These two devices, the BMIC 142 and the bus compatibility port controller 164, are coupled only to the transfer buffer RAM 146 through their appropriate DMA channels 176 and 178 and the RAM controller 170. The BMIC 142 and the compatibility port controller 164 do not have direct access to the integrated disk interface 174 and the disk array A. The local processor is 130 (FIG. 3) connected to the RAM controller 170 through a local processor RAM channel 80 and is connected to the disk controller 172 through a local processor disk channel 182. Thus, the local processor 130 is connected to both the transfer buffer RAM 146 and the disk array A as desired.

Additionally, there are 4 DMA disk channels 184, 186, 188 and 190. These 4 DMA channels 184–190, allow information to be independently and simultaneously passed between the disk array A and the RAM 146. It is noted that the fourth DMA/disk channel 190 also includes XOR capability so that parity operations can be readily performed in the transfer controller 144 without requiring computations by the local processor 130. The above computer system and disk array subsystem represent the preferred computer system for the practice of the method of the present invention.

In the preferred embodiment, a disk request is preferably submitted to the disk array controller 112 through the BMIC 142. The local processor 130 on receiving this request through the BMIC 142, builds a data structure in the local processor RAM memory 136. This data structure is known as a command list and may be a simple READ or WRITE request directed to the disk array, or it may be a more elaborate set of requests containing multiple READ/WRITE or diagnostic and configuration requests. The command list is then submitted to the local processor 130 for processing. The local processor 130 then oversees the execution of the command list, including the transferring of data. Once the execution of the command list is completed, the local processor 130 notifies the operating system device driver. The submission of the command list and the notification of the command list completion are achieved by a protocol which uses the BMIC 142 I/O registers.

The method of the present invention operating on the disk array controller is implemented as a number of application tasks running on the local processor 130. Because of the nature of the interactive input/output operations, it is impractical for the illustrative computer system to process disk commands as single batch tasks on a local processor 130. Accordingly, the local processor 130 utilizes a real time multi-tasking use system which permits multiple tasks to be addressed by the local processor 130, including the method of the present invention. Preferably, the operating system on the local processor 130 is the AMX86 multi-tasking executive by Kadak Products, Ltd. The AMX operating system kernel provides a number of system services in addition to the applications set forth in the method of the present invention.

Figure 5:
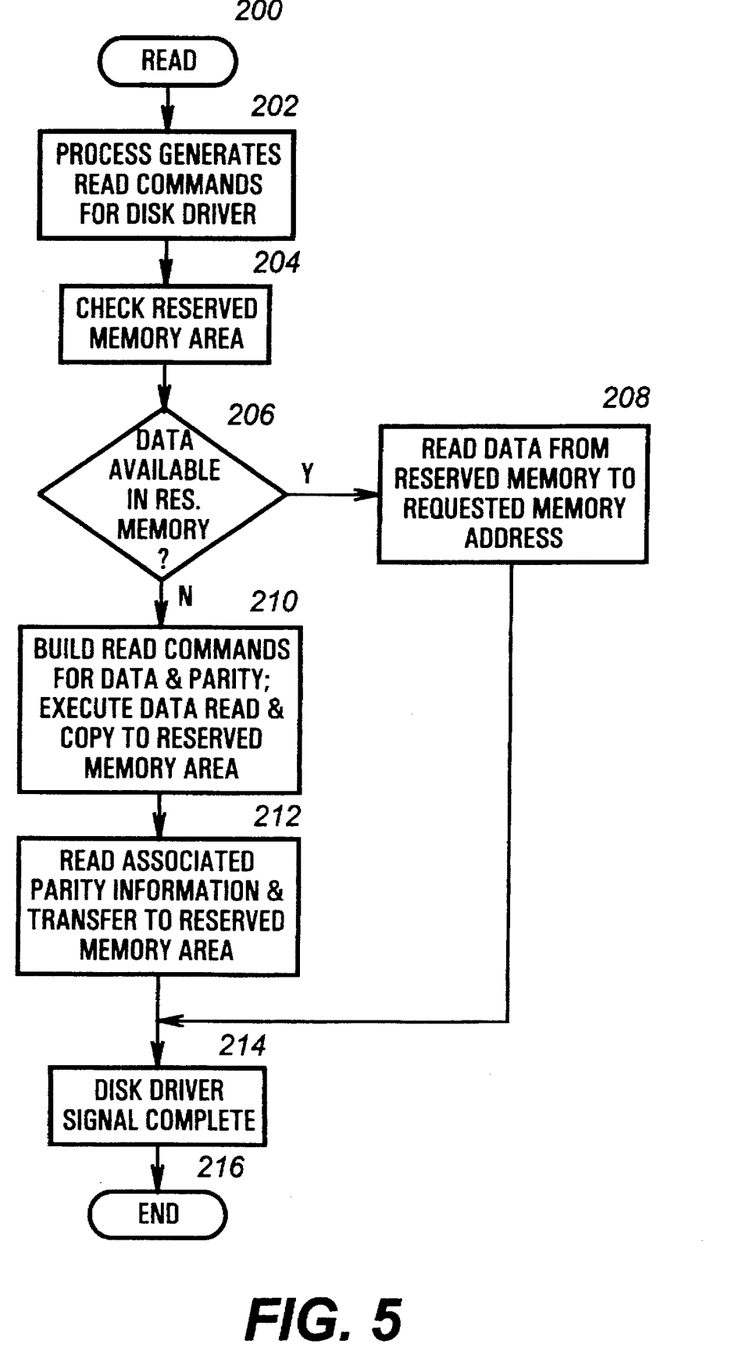
FIG. 5 is a flow diagram of a READ operation in the method of the present invention when the system or local processor performs the XOR operation.

FIG. 5 depicts the READ operation in the method of the present invention on a generic computer having three or more disk drives utilizing XOR parity fault tolerant techniques. The system contemplated in FIG. 5 is not of the type described in FIGS. 1–4 and does not include an intelligent disk array controller. Further, the method depicted in FIG. 5 is for a computer system in which the device driver utilizes the system processor 20 to perform XOR operations. A READ operation begins in step 200. Control of the system processor 20 is transferred to step 202, wherein the system processor 20 is executing the application program and generates READ commands for the disk device driver, that portion of the software contained within the computer system C which performs the actual interface operations with the disk units. The system processor 20 is controlled by the device driver which instructs the system processor 20 to perform specific tasks required to carry out the required I/O operations. Control of the system processor 20 transfers to step 204, which is contained in the disk driver software, wherein the system processor 20 checks the reserved memory area address tags and coherency bits to determine whether the data to be read is present and valid in the reserved memory area. The reserved memory area operates as a cache memory area and its size may be set during initialization of the computer. The reserved memory area may be operated using known cache management techniques. The memory may be managed as a multiple set-associative cache memory having coherency bits which may be used to ensure that the proper parity information is associated with the data. The cache replacement algorithms used to manage the reserved memory may include known first-in-first-out (FIFO), random or least recently used (LRU) techniques.

Control transfers to step 206, wherein the device driver instructs the system processor 20 to branch based on whether the requested data is present and valid in the reserved memory area. If in step 206 it is determined that the requested data is present and valid in the reserved memory area, control of the system processor 20 transfers to step 208, wherein the requested data is read from the reserved memory area to the requested memory address in the READ command. Control of the system processor 20 then transfers to step 214.

If in step 206 it is determined that the requested data is not present and valid in the reserved memory area, control transfers to step 210, wherein the disk device driver instructs the system processor 20 to build disk specific commands to perform the required READ operations from the data disk and the transfer of the parity information associated with this data from the parity disk. It is noted that if the operation is for a full stripe, the parity need not necessarily be obtained. The parity data for the stripe can be readily generated from the data, so space in the reserved memory area may be utilized for storage of additional data. However, this alternative may complicate the cache control portion of the software in some instances and it may be desirable to always retrieve the parity information with the data.

The system processor 20 executes the data READ command, reading the requested data from the data disk and transferring the data to system memory 58. A copy of the requested data is also transferred to the reserved memory area with its address acting as a cache tag and the appropriate coherency bits are set to valid. Control transfers to step 212, wherein the device driver instructs the system processor 20 to generate a READ parity command for the parity disk sectors associated with the data disk sectors read. The system processor 20 executes the READ parity command and a copy of the parity information associated with the data is stored in the reserved memory area, again with its respective address acting as a cache tag and the appropriate coherency bits set to valid. Control transfers to step 214, wherein the disk device driver signals READ complete, thereby freeing the system processor 20 to return to the application program. Control transfers to step 216, which completes the READ cycle, with the application program continuing operation.

It is also contemplated that a disk array 112 having a local processor 130 would perform the steps set forth in FIG. 5 in a similar manner. The device driver running on the system processor 20 would first determine if the requested data and associated parity information are present and valid in the reserved memory area. If the requested data and its associated parity information are present and valid in the reserved memory area, the requested data would be read from the reserved memory area, as a memory to memory transfer and the disk driver would signal complete.

If the requested data and its associated parity are not present and valid in the reserved memory area, the system processor 20 would issue a high level READ command as a command list. The local processor 130 would receive the disk commands via the CPC 164 or the BMIC 142 and the transfer controller 144. The device driver would then wait until a READ complete signal is issued by the disk array 112. The local processor 130 would build disk specific READ commands to read the data and its associated parity information which are queued for execution by the local processor 130. The READ commands are executed by the local processor 130 and the data requested by the device driver is transferred to a specific address in memory 58. Further, the READ commands cause the local processor 130 to also transfer a copy of the data and its associated parity information to the reserved memory area, again with their respective addresses acting as cache tags and the appropriate coherency bits set to valid. The local processor 130 would then signal a READ complete freeing the system processor 20 to continue running the application program.

Figure 6:
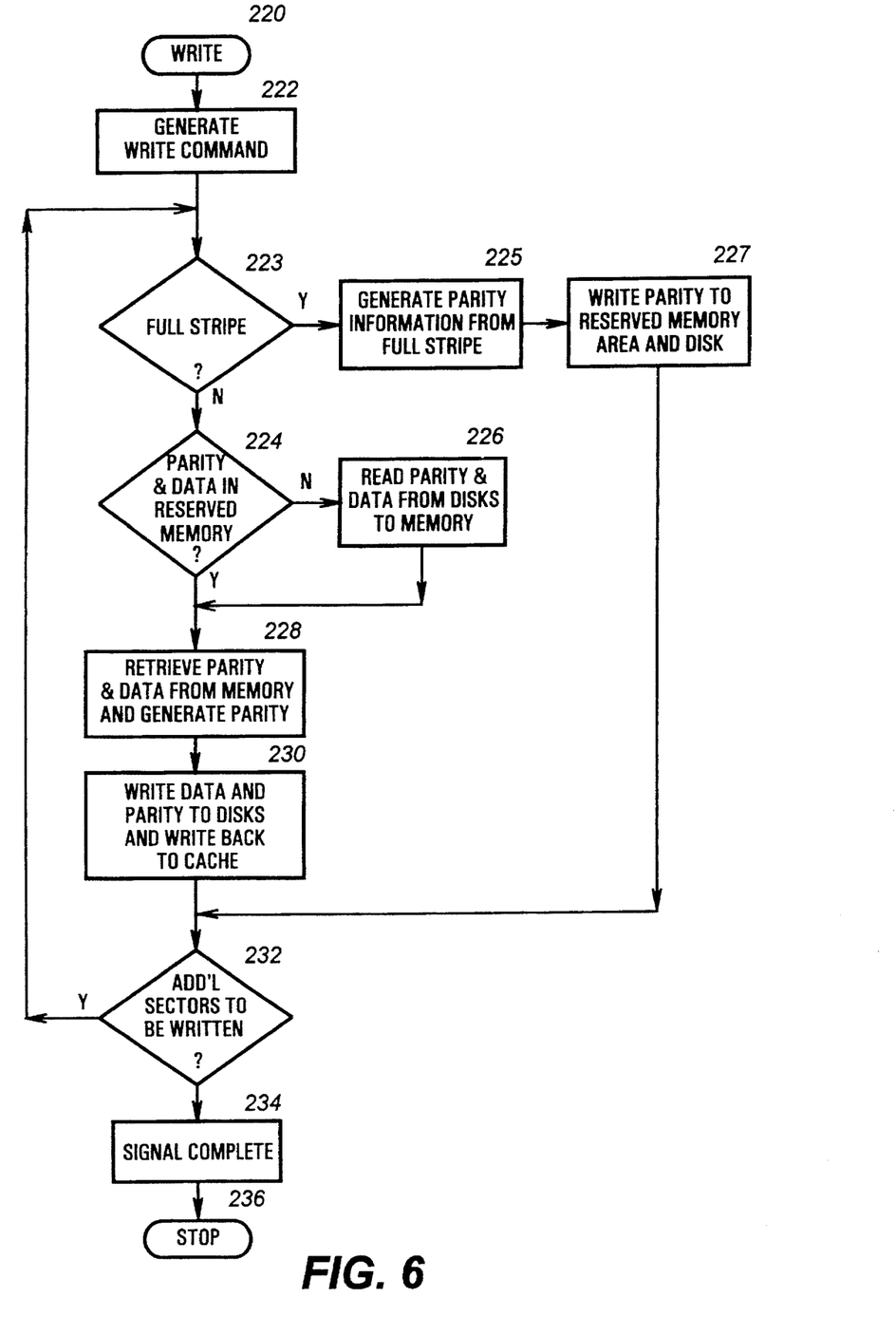
FIG. 6 is a flow diagram of a WRITE operation in the method of the present invention when the system or local processor performs the XOR operation.

FIG. 6 is a flow diagram of the method of performing a WRITE operation for a generic computer not having an intelligent disk array controller. A WRITE operation begins at step 220. Control of the system processor 20 is transferred to step 222 where the system processor 20 is operating in an application program and generates a WRITE command to the disk device driver. As in FIG. 5, the disk device driver software assumes control of the system processor 20. Control transfers to step 223, wherein the device driver determines whether at least a full stripe is being written to the disk array. If in step 223 it is determined that a full stripe is being written, control transfers to step 225. In step 225 the device driver causes the processor 20 to generate the parity information from all the full data stripe WRITE operations. Control then transfers to step 227, wherein the processor 20 writes the parity information and the data to the reserved memory area and writes the information to disk. If only partial stripe parity information caching is being utilized, the new parity information is not written to the reserved memory area, only to the disk array. Control thereafter transfers to step 232.

If in step 223 it is determined that a full stripe of data is not being written to the disk arrays, controls transfers to step 224. In step 223 the system processor 20 determines whether a full data stripe is being written to the array. It will be appreciated that the write command may specify a partial data stripe, a full data stripe, or a full data stripe plus a partial data stripe written to the disk array. If in step 223 the device driver determines that at least one full data stripe is being written to the array, control transfers to step 225. If in step 223, it is determined that a partial data stripe is being written to the disk array, the device driver causes control of system processor 20 to follow the steps set forth in step 224 and thereafter for the partial data stripe. Any full data stripe will be written to the disk array according to the steps of 225 and thereafter.

In step 224 the system processor 20 checks the reserved memory area address tags and coherency bits to determine whether the old parity information and old data for the disk sectors to be updated are present and valid in the reserved memory area. If the associated parity information and old data are not present and valid the reserved memory area, control transfers to step 226 wherein the device driver causes the system processor 20 to generate disk specific READ commands which read the associated parity information and old data from the parity and data disks, respectively, and place this information into temporary buffers in memory 58. Control then transfers to step 228. It is noted that if only partial stripe parity is being retained in the reserved memory area, a circumstance may arise in a partial stripe write where the data is present but the parity information is not present. In that case only parity information is requested on step 226. If in step 224 it is determined that the old data and its associated parity information for the data sectors to be written to are present and valid in the reserved memory area, control of the system processor 20 transfers to step 228.

In step 228, the system processor 20 uses the new data and old data and the old parity information from the write buffer area and memory area, either reserved or temporary as appropriate, to generate the new XOR information. If in step 224, it is determined that the old data and its associated parity information are present and valid in reserved memory, the old data and its associated parity information will be read from the reserved memory area. If, in step 224, it is determined that the old data and its associated parity information are not available in the reserved memory area, the old data and parity information is read from temporary buffers in memory 58. Control of the system processor 20 transfers to step 230, wherein the device driver causes the system processor 20 to write the new data and new parity information to their respective disks. The device driver also causes the system processor 20 to write the new data and the new parity information to be written to the reserved memory area. The disk addresses for the new data and new parity information are used as caches tags and the appropriate cache coherency bits are set to indicate that the data and its associated parity information are valid. Control transfers to step 232, wherein the device driver determines whether there are additional data sectors to be written to disk. If additional sectors are to be written, control transfers to step 224. If no additional sectors are to be written, control transfers to step 234 wherein the device driver signals complete. Control transfers to step 236 which terminates the WRITE operation, and the device driver frees the system processor 20 to resume execution of the application program.

Therefore, it can be seen that no partial sector READ operations followed by WRITE operations were performed if the data and parity information were present in the revised memory area. Only WRITE operations were performed. Not only does the memory caching improve retrieval times, it also prevents the occurrence of a READ followed by a WRITE to the same sector of the disk drive, thus overcoming the lost revolution problem.

Again, it is contemplated that a disk array 112 having a local processor 130 may be used to perform the operations set forth in FIG. 6. The active process or applications program will cause the system processor 20 to issue a WRITE request which is passed to the disk device driver. The device driver will assume control of the system processor 20 and will check the reserved memory area to determine whether the data to be overwritten and its associated parity information are present and valid in the reserved memory area. If the data and its associated parity information are present and valid in the reserved memory area, the device driver will cause the system processor 20 to issue a WRITE command list which indicates that the data and its associated parity information are present and valid in the reserved memory area. The device driver will then wait until the disk array 112 signals completion of the WRITE operation.

If the data and its associated parity are not available in the reserved memory area, the device driver will cause the system processor 20 to issue a WRITE command list which indicates that the old data and its associated parity information are not present and valid in the reserved memory area. Again, the device driver will wait until it receives a completion signal from the disk array controller 112.

The disk array controller 112 receives the command list from the device driver. The local processor 130 will create disk specific WRITE instructions for the new data. The local processor will also determine if the data and its associated parity information are present and valid in the reserved memory area, based on the information issued by the device driver in the WRITE command list. If the old data and its associated parity information are present and valid in the reserved memory area, the local processor 130 will read the old data and its associated parity information from the reserved memory area. The local processor 130 will use the new data, old data and its associated parity information to create the new XOR parity information. The local processor 130 will then create disk specific WRITE instructions for the new parity information and queue the new data and the new parity WRITE instructions for execution by the local processor 130. The local processor 130 will write a copy of the new data and its associated new parity information to the reserved memory area. Again, the disk addresses for the new data and parity information will act as cache tags and the appropriate coherency bits will be set to indicate that the data and parity information are valid. Upon completion of the WRITE operation, the disk array controller 112 will signal WRITE completion to the disk device driver, which will release control of the system processor 20 to continue execution of the active process or applications program.

If the WRITE command list issued by the device driver running on the system processor 20 indicates that the existing data and parity information are not present and valid in the reserved memory area, the local processor 130 will create and execute disk READ instructions which will result in the old data and its associated parity information to be read and transferred to temporary buffers. The local processor 130 will then use the new data, old data and old parity information to create the new parity information using known XOR techniques. The local processor 130 will then create a disk WRITE instruction for the new parity information and queue the new data and parity WRITE instructions for execution by the local processor 130. Upon completion of the WRITE operations, the local processor will signal WRITE complete to the disk device driver which terminates the WRITE operation and releases control of the system processor.

Figure 7:
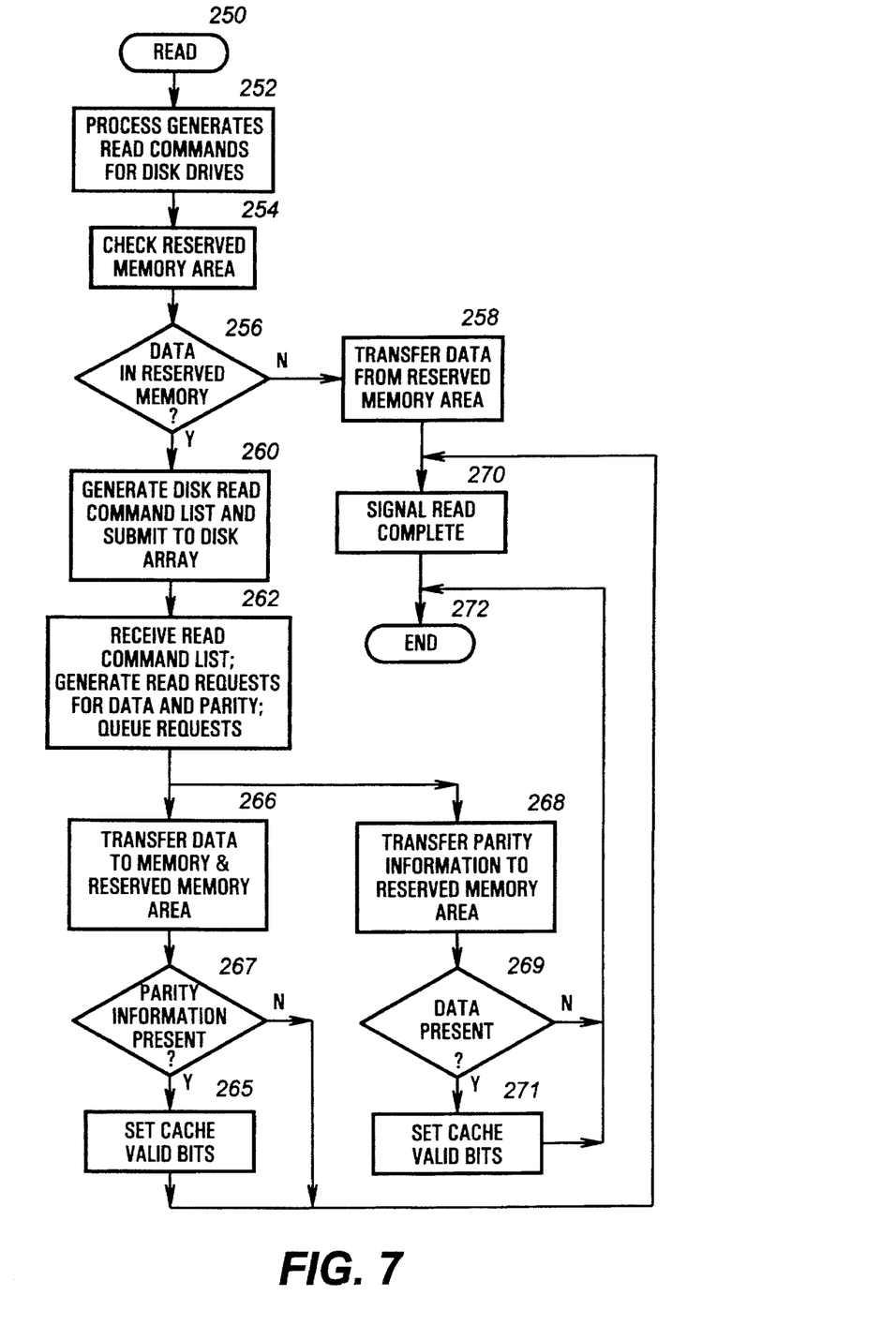
FIG. 7 is a flow diagram of a READ operation in the method of the present invention when utilizing the controller of FIG. 3.

FIG. 7 represents the READ operation as carried out on a disk array subsystem using an intelligent disk array controller (IDA). The READ operation begins at step 250. Control transfers to step 252, wherein the active process or application program causes the system processor 20 to generate a READ command which is passed to the disk device driver. Control transfers to step 254, wherein the disk device driver assumes control of the system processor 20 and causes the system processor 20 to check the reserved memory area cache tags to determine if the data requested is present and valid in the reserved memory area. Control transfers to step 256, wherein the disk device driver branches based on its check of the reserved memory area. If the requested data is present and valid in the reserved memory area, control transfers to step 258, wherein the device driver causes the system processor 20 to read the requested data from the reserved memory area. Control then transfers to step 270.

If it is determined in step 256 that the requested data is not present and valid in the reserved memory area, control transfers to step 260, wherein the disk device driver causes the system processor 20 to generate a READ command list similar to that described in U.S. patent application Ser. No. 431,737 assigned to Compaq Computer Corporation, assignee of the present invention. The READ command list is sent to the disk array 112, after which operation the device driver waits until it receives a READ complete signal. The command list includes addresses for deposit of the requested data in the read buffers and in the reserved memory area and the parity information in the reserved memory area if full stripe parity information is being cached or if a partial stripe operation stripe operation has been requested. Control of processor 20 then transfers to step 282.

In step 262, the disk array 112 receives the READ command list, via the BMIC 142 or CPC 146 and the transfer controller 144. (FIG. 3) The local processor 130 generates disk specific READ requests for the requested data and its associated parity information, queues the requests in local RAM 136 and executes the requests. Control transfers to step 266, wherein the requested data is transferred from disks A through the transfer controller 144 and the BMIC 142 or the CPC 164 to the system memory 58 addresses indicated by the requesting task. Further, a copy of the requested data is transferred to the reserved memory area, using the address using the address indicated by the requesting task as a tag. The disk array controller 112 should then signal READ complete to the disk device driver, which will release control of the system processor 20. Because the disk array controller 112 is capable of performing multi-tasking operations, the local processor 130 carries out the transfer of the parity information essentially simultaneously with the transfer of the data information as set forth in step 156. However, because the system processor 20 does not require the parity information to continue processing, the system processor 20 need not wait for the transfer of the parity information. Accordingly, control transfers to the device driver which makes a determination in step 267 whether the parity information has been received. If the parity information has been received, control transfers to step 265 where the cache valid bits are set to valid. Control then transfers to step 270. If the parity information has not been received in step 267, control transfers to step 270, wherein the disk device driver signals READ completion upon transfer of the data to memory 58, as opposed to waiting until both the data and its associated parity information are transferred. Control then proceeds to step 272, where operation is returned to the application program.

In an alternative not shown, separate valid bits could be utilized for the data and parity information, in which case step 267 is omitted and step 265 sets the data cache valid bit.

In an operation parallel to step 266, in step 268, the local processor 130 transfers a copy of the associated parity information to the reserved memory area. Control proceeds to the device driver upon completion of the transfer. In step 269, the device driver determines if the data has been received in memory 58. If the data has been received, control transfers to step 271, wherein the cache bits are set as valid, as both the parity and data are present. If the data has not been received, control transfers to step 272. After setting the cache bits in step 271, or if the data is not present, control transfers to step 272 wherein control returns to the applications program as the device driver completes. It will be appreciated that the transfer of the parity information to the reserved memory area may occur before or after the READ operation has been completed. The cache is validated when both are present, with the READ operation being completed to the application when the data has been transferred, with or without the parity information.

Again in an alternative where the data and parity information utilize separate valid bits, step 269 would be omitted and step 271 would set the parity information cache valid bit.

If a full stripe is being read and full stripe parity information caching is not being employed, steps 268, 269 and 271 would simply be omitted for full stripe operations but would be performed for partial stripe operations.

Figure 8A:
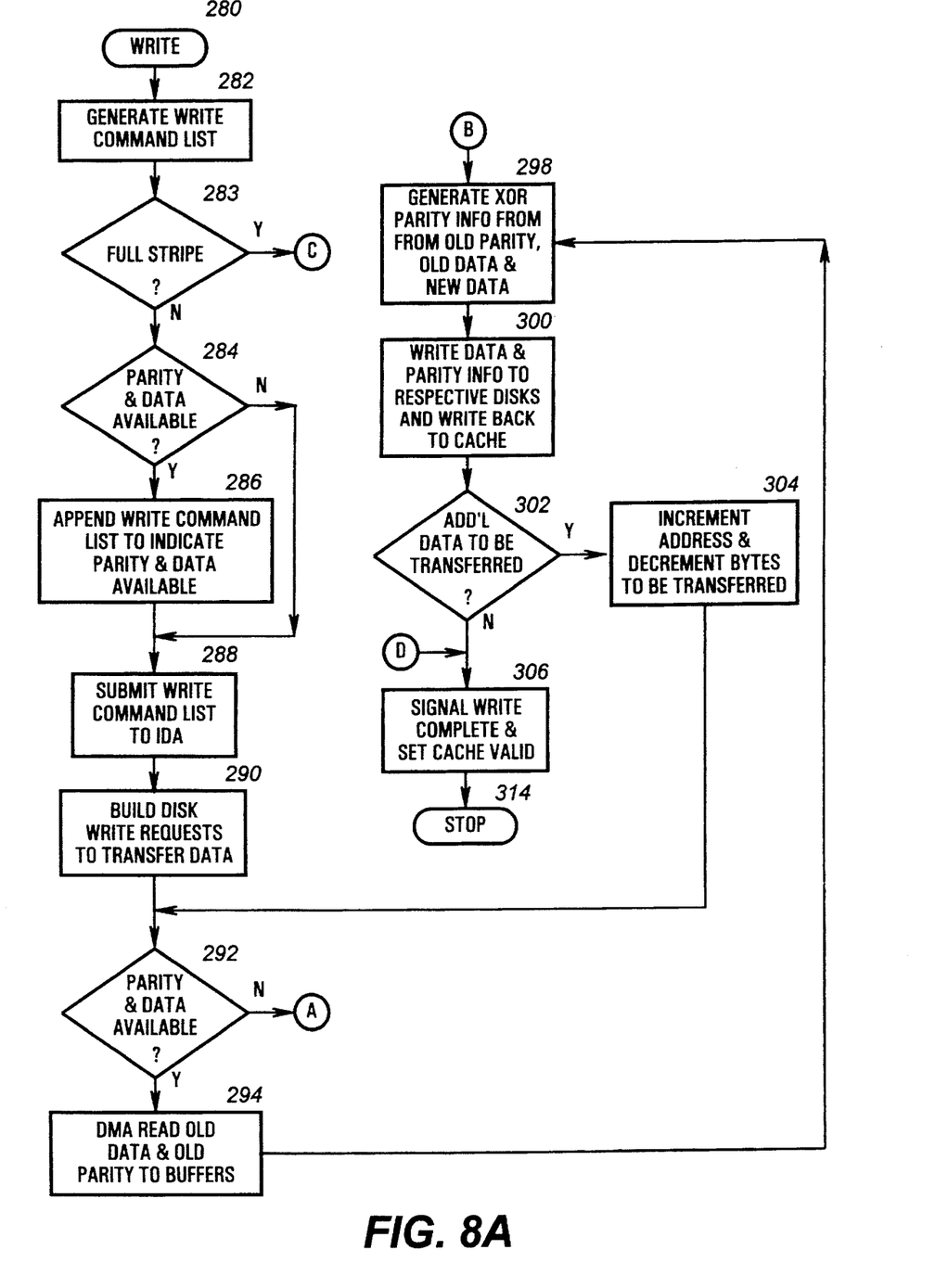
FIGS. 8A and 8B are flow diagrams of a WRITE operation in the method of the present invention when utilizing the controller of FIG. 3.
Figure 8B:
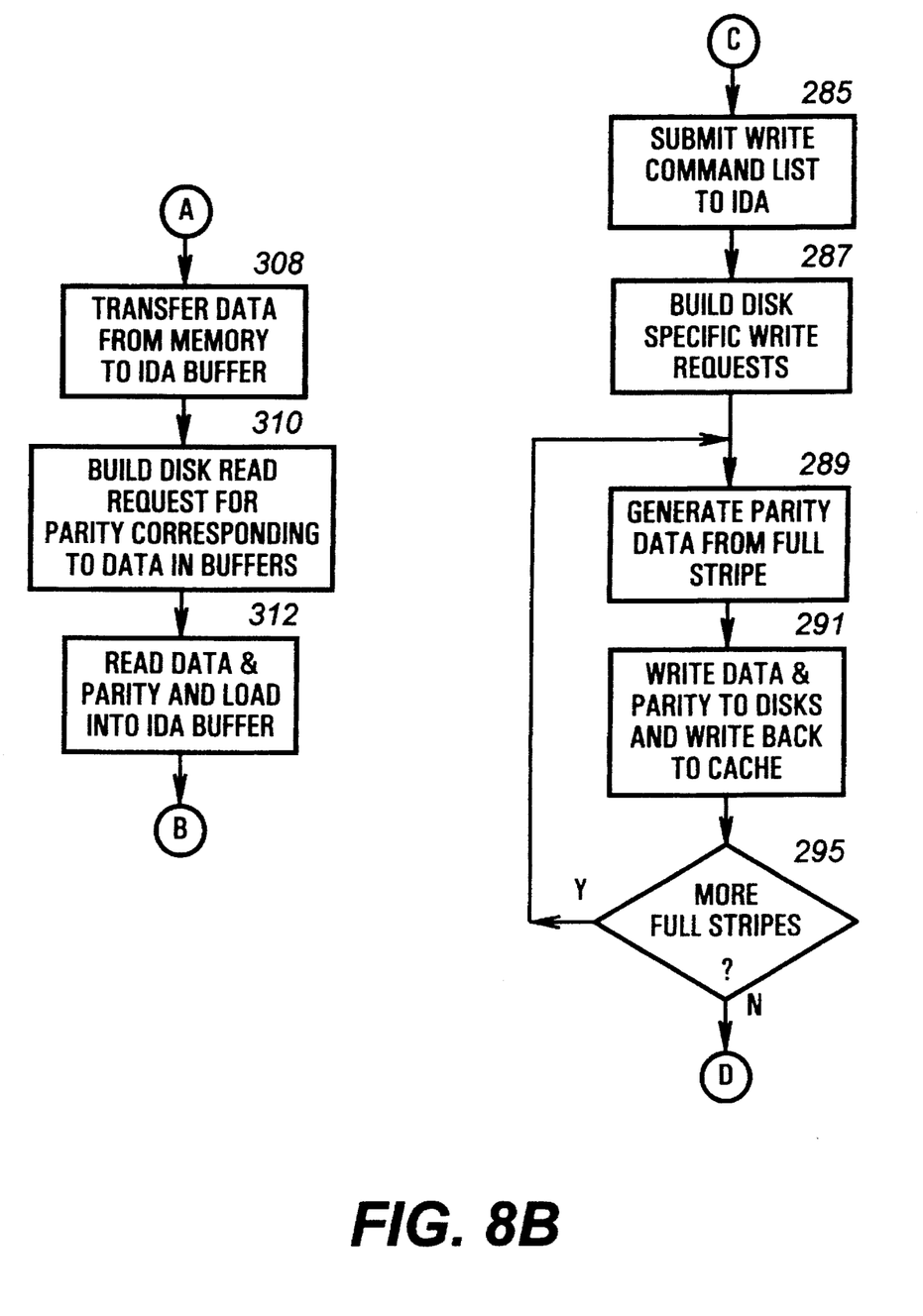

FIGS. 8A and 8B are flow diagrams of the WRITE operation as carried out on a computer system C having an intelligent disk array controller 112. The WRITE operation begins at step 280, in which the active process causes the system processor 20 to generate a WRITE request which is passed to the disk device driver. Control transfers to step 282, wherein the disk device driver assumes control of the system processor 20 and generates a WRITE command list of the type described in U.S. application Ser. No. 431,737.

In the preferred embodiment, it is contemplated that the device driver will create separate WRITE commands within the command list for full stripe writes and partial stripe writes. Thus, when processing the command list the preferred embodiment will branch based on whether the WRITE command is for a full or partial stripe as explained in step 283.

Control of the system processor 20 transfers to step 283, wherein the device driver determines whether the WRITE command calls for a full data stripe to be written to the disk array. If it is determined that a full stripe of data is being written to the disk array, control transfers to step 285, wherein the WRITE command list is submitted to the disk array controller 112 via the BMIC 142 or the CPC 164. The disk driver then goes into a wait state to await a confirmation signal from the disk array. Logical flow of the operations proceeds to step 287, wherein the local processor 130 builds disk specific WRITE requests for the full stripe WRITE operations. Control of the operations then transfers to step 289, wherein the transfer controller chip 144 generates parity data from the full stripe of data being written to the disk array. Control of the operations then transfers to step 291, wherein the TCC 144 writes the data and the newly generated parity to disks within disk array 112. Further, the local processor 130 will cause the disk array controller 112 to write the data back to the reserved memory area along with the newly generated parity information. Control thereafter transfers to step 293, wherein the local processor 130 determines whether additional full stripes are to be written to the disk array. If additional full stripes are to be written to the disk array, control transfers to step 289. If no additional full stripes are to be written to the disk array, control transfers to step 306.

It will be appreciated that WRITE operations for full stripes of data may be executed virtually simultaneously with any partial writes of data as a result of the multi-tasking environment used within the disk array controller 112. Where less than a full stripe of data is being written to the disk array, or a partial stripe in addition to one or more full stripes of data is also being to the disk array, control of the system processor 20 transfers from step 283 to step 284, wherein the disk device driver causes the system processor 20 to check whether the data which is to be overwritten (old data) and its associated parity information (old parity) are present and valid in the reserved memory area. If the old data and old parity information are not present and valid in the reserved memory area, the disk device driver causes control of system processor 20 to transfer to step 288. Optionally, the device driver can provide memory address information for receiving copies of the data and parity information after the WRITE operation is complete if all writes are being cached. If only the old data is available in cases where only partial stripe parity information is being cached, the system processor 20 may append the WRITE command list to include an indication that the old data is available, including memory addresses.

If, in step 284, it is determined that the old data and old parity information are present and valid in the reserved memory area, the device driver causes control of the system processor 20 to transfer to step 286, wherein the system processor 20 appends the WRITE command list to indicate that the old data and old parity information are available in the reserved memory area and provides the memory addresses of the old data and old parity information for use by the array controller 112, both to obtain the data and for providing the parity information. The disk device driver then causes control of the system processor 20 to transfer to step 288. In step 288, the disk device driver causes the system processor 20 to submit the WRITE command list to the disk array controller 112. The device driver then waits until it receives a WRITE completion signal from the disk array controller 112 and control transfers to step 290.

In step 290, the local processor 130 within the disk array controller 112 builds the disk WRITE request to transfer data from memory to disks, based on the WRITE command list submitted in step 288. Control transfers to step 292, wherein the local processor 130 determines whether the WRITE command list submitted in step 288 indicates the old data and old parity information for the specific sectors to be written to are present and valid in the reserved memory area. If not available, control of the local processor 130 transfers to step 308.

If, in step 292, it is determined that the old data and old parity information are present and valid for the data sector to be written, control of the local processor 130 transfers to step 294. In step 294, the local processor 130 performs a transfer of the old data and old parity information from the reserved memory area to the transfer buffer RAM 146. Control of the local processor 130 transfers to step 298.

In step 298, the transfer controller 144 accesses the new data and old parity information and old data stored in transfer buffer RAM 146 and utilizes the dedicated XOR DMA parity channel to generate the new XOR parity information from the new data, the old data and the old parity information stored in the transfer buffer 146. This dedicated parity capability permits the preferred embodiment to perform parity operations without requiring computations by the local processor 130. Control transfers to step 300, wherein the transfer controller 144 writes the new data and new parity information to their respective disks through DMA subchannels 184–190. Further, the disk array controller 112 causes a copy of the new data and the new parity information to be written to the reserved memory area via BMIC 142 or CPC 164 using the old addresses or new addresses as provided by the device driver. In this case the parity information would be written back because only a partial stripe was written. The new data and new parity information disk addresses are eventually used as cache tags by the device driver and the appropriate coherency bits are set to indicate that the new data and new parity information is valid.

Therefore, it is noted that also on this embodiment no back-to-back operations and WRITE operations to the same disk drive sector are performed. The old data and old parity information do not have to be read from the disk drives, only the new data and parity written. Thus, operations are improved on partial sector WRITE operations.

Control transfers to step 302, wherein the local processor 130 determines whether additional sectors are to be transferred. If additional sectors are to be transferred, control transfers to step 304, wherein the local processor 130 increments the memory addresses and decrements the number of bytes to be transferred. Control of the local processor 130 then transfers to step 292. If in step 302 it is determined that no additional data is to be transferred, control transfers to step 306, wherein the disk array controller 112 signals WRITE complete to the disk device driver. At this time the device driver can set the cache coherency bits. Control then passes to step 314, wherein the device driver releases control of the system processor 20 to continue execution of the application program. This completes operation of the WRITE sequence. It is understood that the WRITE completion signal could be provided prior to the return of the parity and new data, but because the transfers are preferably performed using the BMIC 142, the transfers occur at a very high rate. Thus, any incremental improvement achieved by signalling an early WRITE completion is considered insufficient to offset the added complexity.

If, in step 292, it is determined that the old data and/or the old parity information are not available in the reserved memory area, control of the local processor 130 transfers to step 308, wherein the local processor 130 queues the WRITE request from the device driver and the BMIC 142 executes the transfer of data from memory to the transfer controller buffer RAM 146. Control transfers to step 310, wherein the local processor 130 builds disk READ requests for the old data and the old parity information corresponding for the data sectors which are to be overwritten, whichever is not available.

It is noted that the flow charts of FIG. 8A and 8B illustrate the case where both data and parity information are being cached. The READ requests are queued and acted upon by local processor 130. Control transfers to step 312, wherein the local processor 130 executes the READ requests and the old parity information and old data are read from their respective disks and loaded into the transfer buffer 146 via the transfer controller 144. Control transfers to step 298. The new parity information is then generated according to the previously described techniques.

For subsequent READ operations on a computer of the type described in either FIGS. 5 or 7, the disk device driver running on the system processor 20 will first determine if the information to be read is present and valid in the reserved memory area. If present and valid, the data may be read directly from the reserved memory area as opposed to carrying out a disk READ operation, thus performing as a conventional disk cache. Replacement, coherency and update of the data and its associated parity information maintained in the reserved memory area may be accomplished using known replacement techniques as stated above.

The foregoing disclosure and description of the invention are illustrative and explanatory thereof, and various changes in the size, shape, materials, components, circuit elements, wiring connections and contacts, as well as in the details of the illustrated circuitry and construction may be made without departing from the spirit of the invention.

I claim:

1. A method for computer disk array read and write operations in a computer system disk array utilizing parity fault tolerance and recovery techniques, the steps comprising:

reading first read data from a first data location in the disk array in response to a first read request occurring prior to a first write request to said first data location;

reading first read parity information associated with said first read data in response to said first read request;

storing a copy of said first read data and said first read associated parity information in a reserved computer memory area; and upon the occurrence of said first request write operation to said first data location:

determining if said reserved computer memory area contains valid copies of said first read data and said first read associated parity information, and if said reserved computer memory area contains valid copies, generating new parity information from said first read data and said first read associated parity information stored in said reserved computer memory area and from new data directed to be written to the disk array by said first write request; and writing only said new parity information and said new data to the disk array.

2. The method of claim 1, wherein the step of generating new parity information is performed by a host computer system processor.

3. The method of claim 1, wherein the step of generating new parity information is performed by a local processor within the disk array.

4. The method of claim 1, wherein the step of generating new parity information is performed by a dedicated XOR engine within the disk array.

5. The method of claim 1, further comprising:

storing said new data and said new parity information in said reserved computer memory area.

6. The method of claim 1, further comprising:

utilizing said stored data in cache operations of the disk array.

7. The method of claim 1, wherein said storing a copy of said read associated parity information is performed only for operations comprising a partial stripe read of the disk array.

\* \* \* \* \*